(12) United States Patent
Patil

(10) Patent No.: US 8,572,401 B1
(45) Date of Patent: Oct. 29, 2013

(54) SYSTEMS AND METHODS FOR SECURING DATA OF VOLUME MIRRORS

(75) Inventor: Roshni Jaywantsingh Patil, Pune (IN)

(73) Assignee: Symantec Corporation, Mountain View, CA (US)

( * ) Notice: Subject to any disclaimer, the term of this patent is extended or adjusted under 35 U.S.C. 154(b) by 738 days.

(21) Appl. No.: 12/533,783

(22) Filed: Jul. 31, 2009

(51) Int. Cl.
- *G06F 11/30* (2006.01)
- *G06F 12/14* (2006.01)
- *G06F 7/00* (2006.01)
- *G06F 17/00* (2006.01)

(52) U.S. Cl.
USPC ........... 713/189; 713/164; 713/193; 707/610; 707/655; 707/657; 707/659; 707/660

(58) Field of Classification Search
USPC .................. 713/193, 189; 707/609–613, 634, 707/655–660
See application file for complete search history.

(56) References Cited

U.S. PATENT DOCUMENTS

| | | | | |
|---|---|---|---|---|
| 6,574,733 B1 * | 6/2003 | Langford | ...................... | 713/194 |
| 6,704,849 B2 * | 3/2004 | Steegmans | .................... | 711/162 |
| 6,948,089 B2 * | 9/2005 | Fujibayashi | ................... | 714/6.3 |
| 7,124,305 B2 * | 10/2006 | Margolus et al. | ............. | 713/193 |
| 7,155,465 B2 * | 12/2006 | Lee et al. | ............... | 1/1 |
| 7,269,743 B2 * | 9/2007 | Yagawa | ........................ | 713/189 |
| 7,320,008 B1 * | 1/2008 | Colgrove | ............... | 1/1 |
| 7,325,111 B1 * | 1/2008 | Jiang et al. | .................... | 711/162 |
| 7,389,379 B1 * | 6/2008 | Goel et al. | ..................... | 711/112 |
| 7,392,425 B1 * | 6/2008 | Schoenthal et al. | ......... | 714/6.32 |
| 7,752,457 B2 * | 7/2010 | Yagawa | ........................ | 713/189 |
| 2003/0037247 A1 * | 2/2003 | Obara et al. | ................... | 713/193 |
| 2004/0123063 A1 * | 6/2004 | Dalal et al. | .................... | 711/170 |
| 2004/0255140 A1 * | 12/2004 | Margolus et al. | ............. | 713/193 |
| 2004/0260973 A1 * | 12/2004 | Michelman | ..................... | 714/13 |
| 2005/0071379 A1 * | 3/2005 | Kekre et al. | ................... | 707/200 |
| 2006/0005048 A1 * | 1/2006 | Osaki et al. | ................... | 713/193 |
| 2006/0195704 A1 * | 8/2006 | Cochran et al. | ............... | 713/193 |
| 2008/0240441 A1 * | 10/2008 | Kawakami | ..................... | 380/277 |
| 2008/0243939 A1 * | 10/2008 | Kottomtharayil et al. | .... | 707/200 |
| 2008/0320319 A1 * | 12/2008 | Muller et al. | .................. | 713/193 |
| 2010/0031017 A1 * | 2/2010 | Gokhale et al. | ................ | 713/153 |
| 2010/0332818 A1 * | 12/2010 | Prahlad et al. | ................ | 713/150 |
| 2013/0024424 A1 * | 1/2013 | Prahlad et al. | ................ | 707/640 |

* cited by examiner

*Primary Examiner* — Tae Kim

(74) *Attorney, Agent, or Firm* — ALG Intellectual Property, LLC

(57) ABSTRACT

Various computer-implemented methods for securing data of replicated volumes are disclosed. In one example, an exemplary method for performing such a task may include: 1) identifying a set of plexes of a replicated volume, 2) identifying, within the set of plexes, at least one non-trusted plex, 3) intercepting data to be replicated to the non-trusted plex, 4) encrypting the data to be replicated to the non-trusted plex, and then 5) writing the encrypted data to the non-trusted plex. Various other methods, systems, and computer-readable media are also disclosed.

19 Claims, 13 Drawing Sheets

SYSTEMS AND METHODS FOR SECURING DATA OF VOLUME MIRRORS

BACKGROUND

Organizations increasingly depend on critical applications and data in the course of business. For this reason, organizations typically attempt to control the risk of losing sensitive data managed by an application.

For example, an application might run at a local computing site where a disaster could occur, destroying the application, its data, and any local backup mechanisms. In some cases, an organization may attempt to ameliorate such a risk by replicating the data to another remote site by, for example, mirroring the volumes on which the application and data reside.

For various reasons, including redundancy and convenience, some copies (or "plexes") of a replicated volume may be stored in unsecure locations. Unfortunately, each plex of a replicated volume that is stored in an unsecured location may represent a security risk due to the possibility of a data leak. As such, the instant disclosure identifies a need for securing the data in plexes of replicated volumes.

SUMMARY

As will be described in greater detail below, the instant disclosure generally relates to systems and methods for securing data of volume mirrors. In one example, an exemplary method for performing such a task may include: 1) identifying a set of plexes of a replicated volume, 2) identifying, within the set of plexes, at least one non-trusted plex, 3) intercepting data to be replicated to the non-trusted plex, 4) encrypting the data to be replicated to the non-trusted plex, and then 5) writing the encrypted data to the non-trusted plex.

In some examples, the method may also include preferring to fulfill read requests for the replicated volume through trusted plexes instead of non-trusted plexes in order to improve I/O response time. The method may also include: 1) receiving a request to read data from the replicated volume, 2) retrieving the data from the non-trusted plex, and then 3) decrypting the data retrieved from the non-trusted plex.

In some embodiments, writing the encrypted data to the non-trusted plex may include replicating the encrypted data to the non-trusted plex asynchronously. In such an embodiment, the method may include: 1) creating a dirty region log for the non-trusted plex, 2) setting a dirty flag in the dirty region log for the data to be replicated, 3) simulating a successful write attempt of the data before encrypting the data, 4) receiving confirmation from the non-trusted plex of successful replication, and then 5) clearing the dirty flag.

In one example, intercepting data to be replicated to the non-trusted plex may include: 1) detecting that the non-trusted plex has become detached from the replicated volume and then 2) tracking data changes to the replicated volume using a dirty region log. In such an example, encrypting the data to be replicated to the non-trusted plex may include encrypting data tracked as changed in the dirty region log. In some examples, the method may also include assigning an encryption key for each non-trusted plex in the set of plexes.

In one embodiment, writing the encrypted data to the non-trusted plex may include writing the encrypted data to an encrypted storage replication log on a bunker site. In this embodiment, the method may also include: 1) determining that a primary site containing the replicated volume has failed, 2) identifying a remote site that contains both an asynchronous replication of the replicated volume and a decryption key for the encrypted data, and then 3) transferring synchronously-replicated data from the encrypted storage replication log to the remote site.

In one example, intercepting data to be replicated to the non-trusted plex may include detecting a snapshot of the replicated volume to be stored in the non-trusted plex. In this example, the method may also include: 1) tracking changes made to the replicated volume with a data change object, 2) identifying a request to restore the snapshot of the replicated volume from the non-trusted plex, 3) using the data change object to identify changed data since the snapshot was created, 4) decrypting the changed data from the non-trusted plex, and then 5) writing the decrypted changed data to the replicated volume. The method in this example may also include: 1) prior to writing the decrypted changed data to the replicated volume, receiving a request to read data changed since the snapshot was created and then 2) reading the data changed since the snapshot was created from the non-trusted plex.

In some examples, intercepting the data to be replicated to the non-trusted plex may include intercepting application data. Similarly, encrypting the data to be replicated to the non-trusted plex may include encrypting the application data. In these examples, the method may also include writing, to the non-trusted plex, unencrypted metadata relating to the data to be replicated.

In some embodiments, the method may also include making a decryption key for the non-trusted plex available to a trusted application. In addition, encrypting the data to be replicated to the non-trusted plex may include encrypting the data using the same level of granularity as used when synchronizing the data. The non-trusted plex may be stored in a variety of locations, including, for example, on a remote site in a campus center, a non-trusted storage site, and/or a cloud environment.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
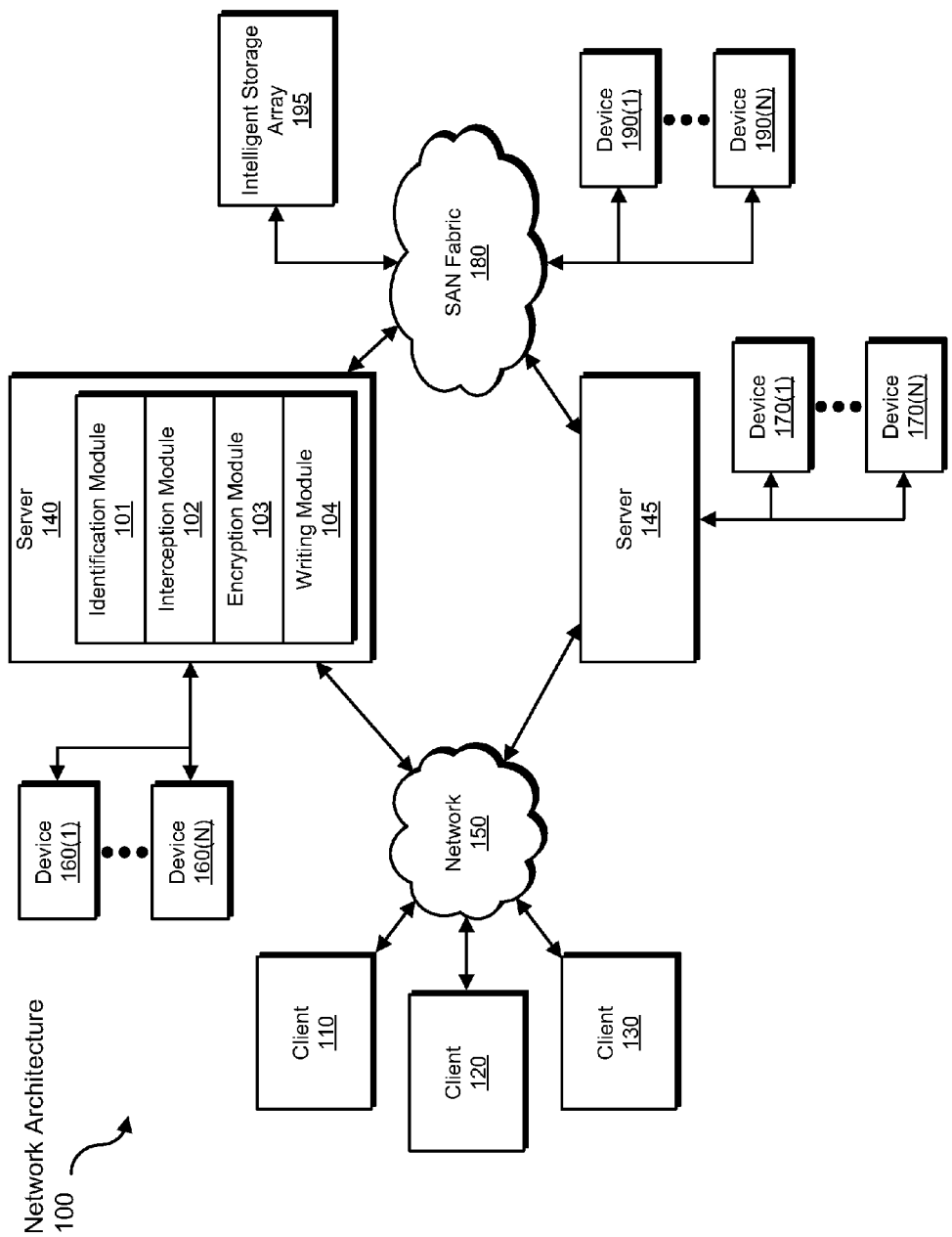
FIG. 1 is a block diagram of an exemplary computing network capable of implementing one or more of the embodiments described and/or illustrated herein.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for securing data of volume mirrors. In one example, the various systems disclosed herein may accomplish this task by: 1) identifying a set of plexes of a replicated volume, 2) identifying, within the set of plexes, at least one non-trusted (i.e., untrusted or unsecure) plex, 3) intercepting data to be replicated to the non-trusted plex, 4) encrypting the data to be replicated to the non-trusted plex, and then 5) writing the encrypted data to the non-trusted plex.

As will be explained below, by securing (e.g., encrypting) data written to non-trusted plexes in this manner, the systems and methods described herein may protect data stored on non-trusted plexes that may otherwise be vulnerable to data leaks. In addition, as will be discussed below, some embodiments described herein may make efficient use of system resources by only encrypting non-trusted plexes and by preferring to read from trusted plexes to avoid unnecessary decryption, thus potentially reducing I/O latency and processor usage.

As used herein, the phrase "replicated volume" may refer to any volume that is subject to copying, replication, mirroring, and/or backup mechanisms. In addition, the term "plex" may refer to a copy, replication, and/or mirror of a volume. Generally, a plex may refer to any set of data that may exist in the course of copying, replicating, mirroring, and/or backing up a volume or other collection of data. In some embodiments, a plex may refer to a collection of data used in the course of replicating a volume (e.g., a storage replication log).

Similarly, the phrase "non-trusted plex" may refer to any plex that is potentially vulnerable to a data leak and/or unwanted information access. For example, a non-trusted plex may refer to a plex stored on an unsecured storage device (e.g., a storage device at a site controlled by a third party) or a plex that may become detached (e.g., a plex on a storage device subject to inspection or maintenance).

Figure 2:
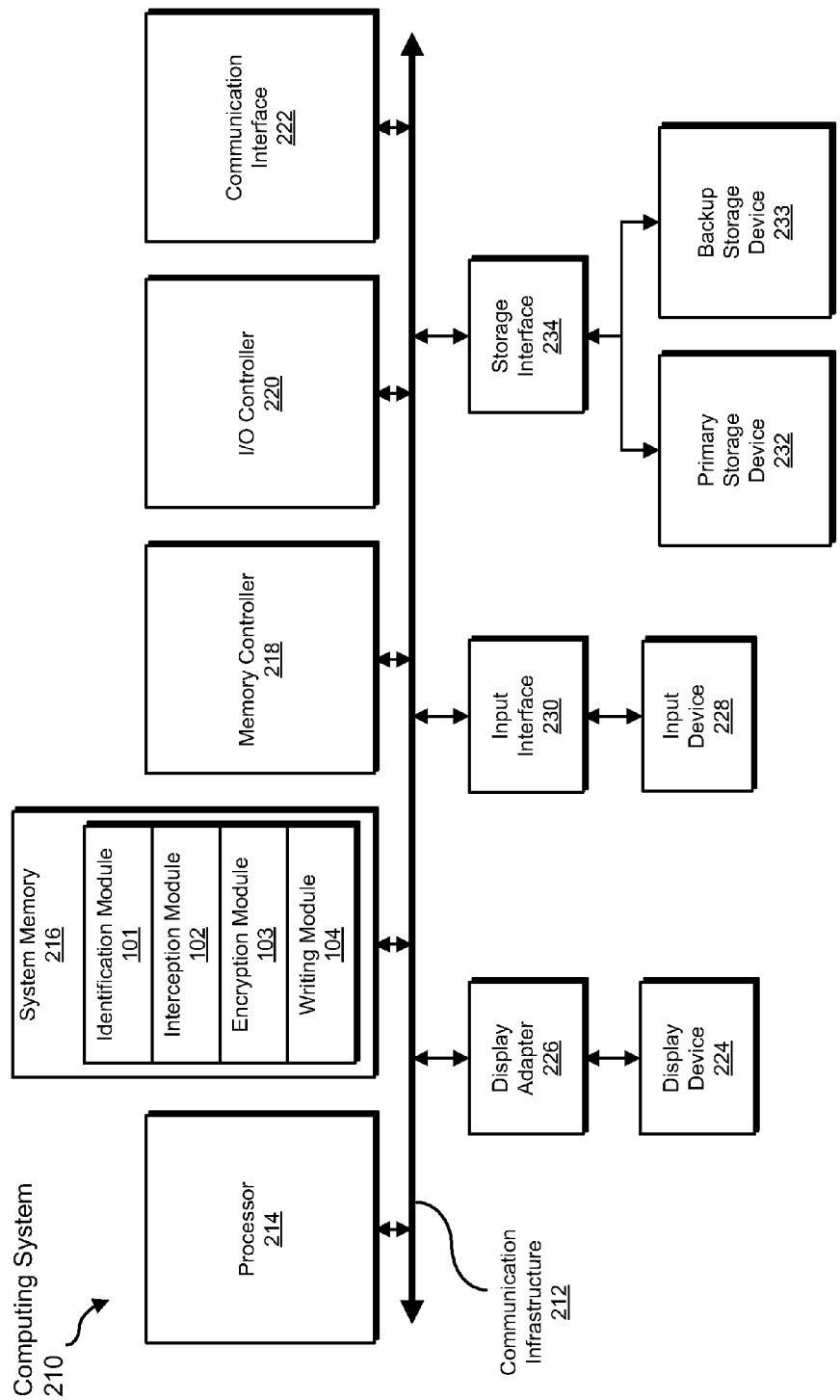
FIG. 2 is a block diagram of an exemplary computing system capable of implementing one or more of the embodiments described and/or illustrated herein.

The following will provide, with reference to FIGS. 1-2, detailed descriptions of an exemplary network architecture and computing system capable of securing data of volume mirrors. Detailed descriptions of exemplary systems and methods for securing data of volume mirrors will also be provided in connection with FIGS. 3-13.

FIG. 1 is a block diagram of an exemplary network architecture 100 capable of implementing one or more of the embodiments described and/or illustrated herein. As illustrated in this figure, client systems 110, 120, and 130 and servers 140 and 145 may be coupled to a network 150. Client systems 110, 120, and 130 generally represent any type or form of computing device or system.

Similarly, servers 140 and 145 generally represent computing devices or systems, such as application servers or database servers, configured to provide various database services and/or run certain software applications. In some embodiments, server 140 may represent a computing device such as exemplary computing system 210 in FIG. 2. Network 150 generally represents any telecommunication or computer network including, for example, an intranet, a wide area network (WAN), a local area network (LAN), a personal area network (PAN), or the Internet.

In one example, server 140 may include one or more modules for securing data of replicated volumes. For example, as will be described in greater detail below, server 140 may include identification module 101, interception module 102, encryption module 103, and/or writing module 104.

As illustrated in FIG. 1, one or more storage devices 160(1)-(N) may be directly attached to server 140. Similarly, one or more storage devices 170(1)-(N) may be directly attached to server 145. Storage devices 160(1)-(N) and storage devices 170(1)-(N) generally represent any type or form of storage device or medium capable of storing data and/or other computer-readable instructions. In certain embodiments, storage devices 160(1)-(N) and storage devices 170(1)-(N) may represent network-attached storage (NAS) devices configured to communicate with servers 140 and 145 using various protocols, such as NFS, SMB, or CIFS.

Servers 140 and 145 may also be connected to a storage area network (SAN) fabric 180. SAN fabric 180 generally represents any type or form of computer network or architecture capable of facilitating communication between a plurality of storage devices. SAN fabric 180 may facilitate communication between servers 140 and 145 and a plurality of storage devices 190(1)-(N) and/or an intelligent storage array 195. SAN fabric 180 may also facilitate, via network 150 and servers 140 and 145, communication between client systems 110, 120, and 130 and storage devices 190(1)-(N) and/or intelligent storage array 195 in such a manner that devices 190(1)-(N) and array 195 appear as locally attached devices to client systems 110, 120, and 130. As with storage devices 160(1)-(N) and storage devices 170(1)-(N), storage devices 190(1)-(N) and intelligent storage array 195 generally represent any type or form of storage device or medium capable of storing data and/or other computer-readable instructions.

In certain embodiments, and with reference to exemplary computing system 210 of FIG. 2, a communication interface, such as communication interface 222 in FIG. 2, may be used to provide connectivity between each client system 110, 120, and 130 and network 150. Client systems 110, 120, and 130 may be able to access information on server 140 or 145 using, for example, a web browser or other client software. Such software may allow client systems 110, 120, and 130 to access data hosted by server 140, server 145, storage devices 160(1)-(N), storage devices 170(1)-(N), storage devices 190(1)-(N), or intelligent storage array 195. Although FIG. 1 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 140, server 145, storage devices 160(1)-(N), storage devices 170(1)-(N), storage devices 190(1)-(N), intelligent storage array 195, or any combination thereof. All or a portion of one or more of the exemplary embodiments disclosed herein may also be encoded as a computer program, stored in server 140, run by server 145, and distributed to client systems 110, 120, and 130 over network 150. Accordingly, network architecture 100 may perform and/or be a means for performing, either alone or in combination with other elements, one or more of the identifying, intercepting, encrypting, writing, preferring, receiving, retrieving, decrypting, creating, setting, simulating, clearing, detecting, tracking, assigning, transferring, using, reading, and/or making steps disclosed herein. Network architecture 100 may also be used to perform and/or be a means for performing other steps and features set forth in the instant disclosure.

FIG. 2 is a block diagram of an exemplary computing system 210 capable of implementing one or more of the embodiments described and/or illustrated herein. Computing system 210 broadly represents any single or multi-processor computing device or system capable of executing computer-readable instructions. Examples of computing system 210 include, without limitation, workstations, laptops, client-side terminals, servers, distributed computing systems, handheld devices, or any other computing system or device. In its most basic configuration, computing system 210 may include at least one processor 214 and a system memory 216.

Processor 214 generally represents any type or form of processing unit capable of processing data or interpreting and executing instructions. In certain embodiments, processor 214 may receive instructions from a software application or module. These instructions may cause processor 214 to perform the functions of one or more of the exemplary embodiments described and/or illustrated herein. For example, processor 214 may perform and/or be a means for performing, either alone or in combination with other elements, one or more of the identifying, intercepting, encrypting, writing, preferring, receiving, retrieving, decrypting, creating, setting, simulating, clearing, detecting, tracking, assigning, transferring, using, reading, and/or making steps described herein. Processor 214 may also perform and/or be a means for performing any other steps, methods, or processes described and/or illustrated herein.

System memory 216 generally represents any type or form of volatile or non-volatile storage device or medium capable of storing data and/or other computer-readable instructions. Examples of system memory 216 include, without limitation, random access memory (RAM), read only memory (ROM), flash memory, or any other suitable memory device. Although not required, in certain embodiments computing system 210 may include both a volatile memory unit (such as, for example, system memory 216) and a non-volatile storage device (such as, for example, primary storage device 232, as described in detail below). In one example, one or more modules configured to secure data of replicated volumes may be loaded into system memory 216. For example, as will be described in greater detail below, an identification module 101, an interception module 102, an encryption module 103, and/or a writing module 104 may be loaded into system memory 216.

In certain embodiments, exemplary computing system 210 may also include one or more components or elements in addition to processor 214 and system memory 216. For example, as illustrated in FIG. 2, computing system 210 may include a memory controller 218, an Input/Output (I/O) controller 220, and a communication interface 222, each of which may be interconnected via a communication infrastructure 212. Communication infrastructure 212 generally represents any type or form of infrastructure capable of facilitating communication between one or more components of a computing device. Examples of communication infrastructure 212 include, without limitation, a communication bus (such as an ISA, PCI, PCIe, or similar bus) and a network.

Memory controller 218 generally represents any type or form of device capable of handling memory or data or controlling communication between one or more components of computing system 210. For example, in certain embodiments memory controller 218 may control communication between processor 214, system memory 216, and I/O controller 220 via communication infrastructure 212. In certain embodiments, memory controller may perform and/or be a means for performing, either alone or in combination with other elements, one or more of the steps or features described and/or illustrated herein, such as identifying, intercepting, encrypting, writing, preferring, receiving, retrieving, decrypting, creating, setting, simulating, clearing, detecting, tracking, assigning, transferring, using, reading, and/or making.

I/O controller 220 generally represents any type or form of module capable of coordinating and/or controlling the input and output functions of a computing device. For example, in certain embodiments I/O controller 220 may control or facilitate transfer of data between one or more elements of computing system 210, such as processor 214, system memory 216, communication interface 222, display adapter 226, input interface 230, and storage interface 234. I/O controller 220 may be used, for example, to perform and/or be a means for performing, either alone or in combination with other elements, one or more of the identifying, intercepting, encrypting, writing, preferring, receiving, retrieving, decrypting, creating, setting, simulating, clearing, detecting, tracking, assigning, transferring, using, reading, and/or making steps described herein. I/O controller 220 may also be used to perform and/or be a means for performing other steps and features set forth in the instant disclosure.

Communication interface 222 broadly represents any type or form of communication device or adapter capable of facilitating communication between exemplary computing system 210 and one or more additional devices. For example, in certain embodiments communication interface 222 may facilitate communication between computing system 210 and a private or public network including additional computing systems. Examples of communication interface 222 include, without limitation, a wired network interface (such as a network interface card), a wireless network interface (such as a wireless network interface card), a modem, and any other suitable interface. In at least one embodiment, communication interface 222 may provide a direct connection to a remote server via a direct link to a network, such as the Internet. Communication interface 222 may also indirectly provide such a connection through, for example, a local area network (such as an Ethernet network), a personal area network, a telephone or cable network, a cellular telephone connection, a satellite data connection, or any other suitable connection.

In certain embodiments, communication interface 222 may also represent a host adapter configured to facilitate communication between computing system 210 and one or more additional network or storage devices via an external bus or communications channel. Examples of host adapters include, without limitation, SCSI host adapters, USB host adapters, IEEE 294 host adapters, SATA and eSATA host adapters, ATA and PATA host adapters, Fibre Channel interface adapters, Ethernet adapters, or the like. Communication interface 222 may also allow computing system 210 to engage in distributed or remote computing. For example, communication interface 222 may receive instructions from a remote device or send instructions to a remote device for execution. In certain embodiments, communication interface 222 may perform and/or be a means for performing, either alone or in combination with other elements, one or more of the identifying, intercepting, encrypting, writing, preferring, receiving, retrieving, decrypting, creating, setting, simulating, clearing, detecting, tracking, assigning, transferring, using, reading, and/or making steps disclosed herein. Communication interface 222 may also be used to perform and/or be a means for performing other steps and features set forth in the instant disclosure.

As illustrated in FIG. 2, computing system 210 may also include at least one display device 224 coupled to communication infrastructure 212 via a display adapter 226. Display device 224 generally represents any type or form of device capable of visually displaying information forwarded by display adapter 226. Similarly, display adapter 226 generally represents any type or form of device configured to forward graphics, text, and other data from communication infrastructure 212 (or from a frame buffer, as known in the art) for display on display device 224.

As illustrated in FIG. 2, exemplary computing system 210 may also include at least one input device 228 coupled to communication infrastructure 212 via an input interface 230. Input device 228 generally represents any type or form of input device capable of providing input, either computer or human generated, to exemplary computing system 210. Examples of input device 228 include, without limitation, a keyboard, a pointing device, a speech recognition device, or any other input device. In at least one embodiment, input device 228 may perform and/or be a means for performing, either alone or in combination with other elements, one or more of the identifying, intercepting, encrypting, writing, preferring, receiving, retrieving, decrypting, creating, setting, simulating, clearing, detecting, tracking, assigning, transferring, using, reading, and/or making steps disclosed herein. Input device 228 may also be used to perform and/or be a means for performing other steps and features set forth in the instant disclosure.

As illustrated in FIG. 2, exemplary computing system 210 may also include a primary storage device 232 and a backup storage device 233 coupled to communication infrastructure 212 via a storage interface 234. Storage devices 232 and 233 generally represent any type or form of storage device or medium capable of storing data and/or other computer-readable instructions. For example, storage devices 232 and 233 may be a magnetic disk drive (e.g., a so-called hard drive), a floppy disk drive, a magnetic tape drive, an optical disk drive, a flash drive, or the like. Storage interface 234 generally represents any type or form of interface or device for transferring data between storage devices 232 and 233 and other components of computing system 210. In one example, database 320 from FIG. 3 may be stored in primary storage device 232.

In certain embodiments, storage devices 232 and 233 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 232 and 233 may also include other similar structures or devices for allowing computer software, data, or other computer-readable instructions to be loaded into computing system 210. For example, storage devices 232 and 233 may be configured to read and write software, data, or other computer-readable information. Storage devices 232 and 233 may also be a part of computing system 210 or may be a separate device accessed through other interface systems.

In certain embodiments, storage devices 232 and 233 may be used, for example, to perform and/or be a means for performing, either alone or in combination with other elements, one or more of the identifying, intercepting, encrypting, writing, preferring, receiving, retrieving, decrypting, creating, setting, simulating, clearing, detecting, tracking, assigning, transferring, using, reading, and/or making steps disclosed herein. Storage devices 232 and 233 may also be used to perform and/or be a means for performing other steps and features set forth in the instant disclosure.

Many other devices or subsystems may be connected to computing system 210. Conversely, all of the components and devices illustrated in FIG. 2 need not be present to practice the embodiments described and/or illustrated herein. The devices and subsystems referenced above may also be interconnected in different ways from that shown in FIG. 2. Computing system 210 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 210. All or a portion of the computer program stored on the computer-readable medium may then be stored in system memory 216 and/or various portions of storage devices 232 and 233. When executed by processor 214, a computer program loaded into computing system 210 may cause processor 214 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 210 may be configured as an application specific integrated circuit (ASIC) adapted to implement one or more of the exemplary embodiments disclosed herein.

Figure 3:
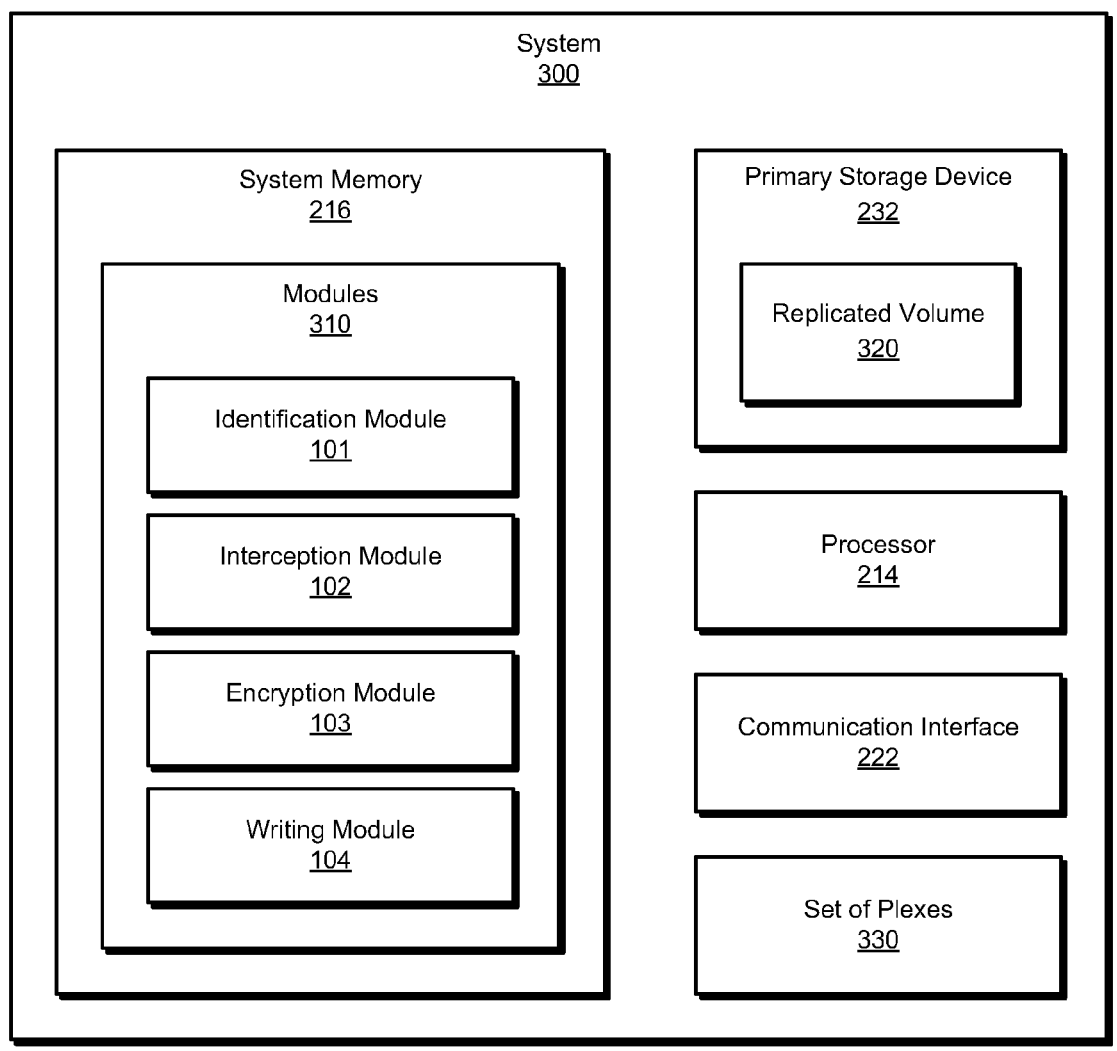
FIG. 3 is a block diagram of an exemplary system for securing data of volume mirrors.

FIG. 3 is a block diagram of an exemplary system 300 for securing data of volume mirrors. As illustrated in this figure, exemplary system 300 may include one or more modules 310 for performing one or more tasks. For example, and as will be explained in greater detail below, exemplary system 300 may include an identification module 101 programmed to identify: 1) a set of plexes of a replicated volume and 2) at least one non-trusted plex within this set of plexes. Exemplary system 300 may also include an interception module programmed to intercept data to be replicated to the non-trusted plex.

In addition, exemplary system 300 may include an encryption module 103 programmed to encrypt the data to be replicated to the non-trusted plex. Exemplary system 300 may also include a writing module 104 programmed to write the encrypted data to the non-trusted plex. Although illustrated as separate elements, one or more of modules 310 in FIG. 3 may represent portions of a single module or application.

In certain embodiments, one or more of modules 310 in FIG. 3 may represent one or more software applications or programs that, when executed by a computing device, may cause the computing device to perform one or more tasks. For example, as will be described in greater detail below, one or more of modules 310 may represent software modules stored and configured to run on one or more computing devices, such as primary site 404 in FIG. 4, computing system 210 in FIG. 2, and/or portions of exemplary network architecture 100 in FIG. 1. One or more of modules 310 in FIG. 3 may also represent all or portions of one or more special-purpose computers configured to perform one or more tasks.

As illustrated in FIG. 3, exemplary system 300 may also include primary storage device 232 from FIG. 2. According to some embodiments, primary storage device 232 may include a replicated volume 320. Replicated volume 320 may have various plexes (i.e., copies of a volume), such as a set of plexes 330.

Exemplary system 300 may also include one or more processors, such as processor 214 from FIG. 2. In one example, processor 214 may execute instructions forming part of one or more of modules 310. Exemplary system 300 may further include communication interface 222 from FIG. 2. In some examples, communication interface 222 may provide connectivity within exemplary system 300 or between exemplary system 300 and another system.

Figure 4:
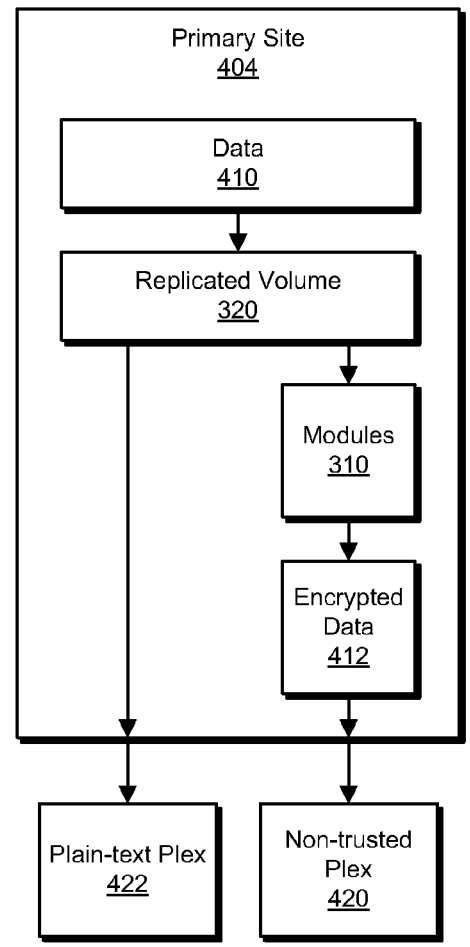
FIG. 4 is a block diagram of an exemplary system for securing data of volume mirrors.

Exemplary system 300 in FIG. 3 may be deployed in a variety of ways. For example, all or a portion of exemplary system 300 may represent portions of exemplary system 400 illustrated in FIG. 4. As illustrated in FIG. 4, exemplary system 400 may include a primary site 404 connected to a non-trusted plex 420 and a plain-text plex 422. Primary site 404 generally represents any type or form of computing system that is capable of hosting a replicated volume. Examples of primary site 404 include, without limitation, application servers and database servers configured to provide various database services and/or run certain software applications. In one embodiment, primary site 404 may include one or more of modules 310 and replicated volume 320 from FIG. 3.

In some examples, primary site 404 may include data 410 to be stored in replicated volume 320 and replicated to various plexes, such as non-trusted plex 420. In this example, modules 310 on primary site 404 may secure data stored on non-trusted plexes. For example, and as will be described in greater detail below, an application may write data 410 to replicated volume 320. In this example, identification module 101 may identify non-trusted plex 420 as a non-trusted plex of replicated volume 320. Interception module 102 and encryption module 103 may then intercept and encrypt, respectively, data 410, producing encrypted data 412. Writing module 104 may then write encrypted data 412 to non-trusted plex 420 (e.g., across a SAN fabric, such as SAN fabric 180 in FIG. 1).

As will be explained below, by securing (e.g., encrypting) data written to non-trusted plexes in this manner, the systems and methods described herein may protect data stored on non-trusted plexes that are otherwise vulnerable to data leaks. In addition, as will be discussed below, some embodiments described herein may make efficient use of system resources by only encrypting data stored on non-trusted plexes and by preferring to read from trusted plexes to avoid unnecessary decryption, thus potentially reducing I/O latency and processor usage.

Figure 5:
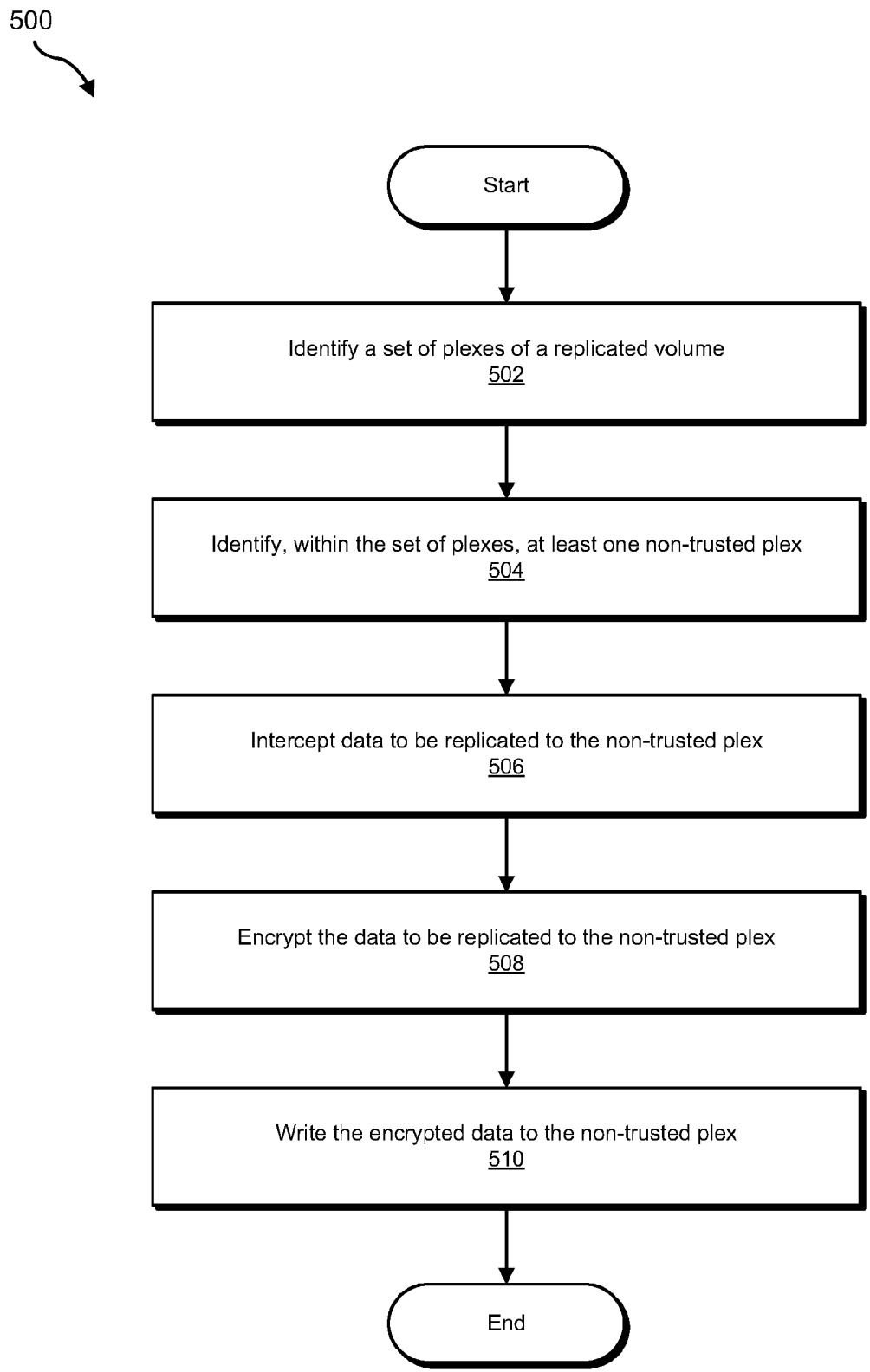
FIG. 5 is a flow diagram of an exemplary method for securing data of volume mirrors.

FIG. 5 is a flow diagram of an exemplary computer-implemented method for securing data of volume mirrors. The steps shown in FIG. 5 may be performed by any suitable computer-executable code and/or computing system. In some embodiments, the steps shown in FIG. 5 may be performed by one or more of the components of network architecture 100 in FIG. 1, computing system 210 in FIG. 2, system 300 in FIG. 3, system 400 in FIG. 4, and/or system 600 in FIG. 6 (as will be explained in greater detail below).

For example, at step 502 in FIG. 5, identification module 101 may, as part of system 300 in FIG. 3, identify a set of plexes of a replicated volume (such as plexes 330 of replicated volume 320 in FIG. 3). Identification module 101 may perform step 502 in a variety of ways. For example, identification module 101 may access a volume manager (such as VERITAS VOLUME MANAGER) to identify plexes that correspond to a replicated volume.

At step 504 in FIG. 5, identification module 101 may identify, within the set of plexes identified in step 502, at least one non-trusted plex. Identification module 101 may perform step 504 in a variety of ways. For example, identification module 101 may read a configuration file (e.g., a configuration file stored on primary storage device 232 of FIG. 3) that lists non-trusted plexes identified by an administrator. Additionally or alternatively, identification module 101 may identify a non-trusted plex by determining that a plex may be insecure. For example, identification module 101 may determine that a plex may be insecure by determining that the plex is located on untrusted storage (such as non-trusted plex 420 in FIG. 4) or by determining that the plex is configured to become detached from the replicated volume.

At step 506 in FIG. 5, interception module 102 may intercept data to be replicated to the non-trusted plex identified in step 504. Interception module 102 may perform step 506 in a variety of contexts. For example, in some embodiments interception module 102 may interface with a volume manager (such as VERITAS VOLUME MANAGER) associated with the replicated volume (e.g., replicated volume 320 of FIG. 4). Additionally or alternatively, interception module 102 may intercept data to be replicated to the non-trusted plex by monitoring and intercepting network traffic (e.g., by monitoring traffic through communication interface 222 of FIG. 3) generated in the course of volume replication. Generally, interception module 102 may intercept data to be replicated to the non-trusted plex in any manner that will allow one or more of modules 310 to encrypt the data before writing the data to the non-trusted plex. For example, in FIG. 4 modules 310 may intercept data 410.

In another context, interception module 102 may intercept data to be replicated to the non-trusted plex by: 1) detecting that the non-trusted plex has become detached from the replicated volume and 2) tracking data changes to the replicated volume using a dirty region log. Interception module 102 may detect that the non-trusted plex has become detached from the replicated volume by, for example, querying the volume manager of the replicated volume concerning the state of the non-trusted plex, configuring the volume manager of the replicated volume to notify interception module 102 when the non-trusted plex has become detached, or in any other suitable manner.

Figure 6:
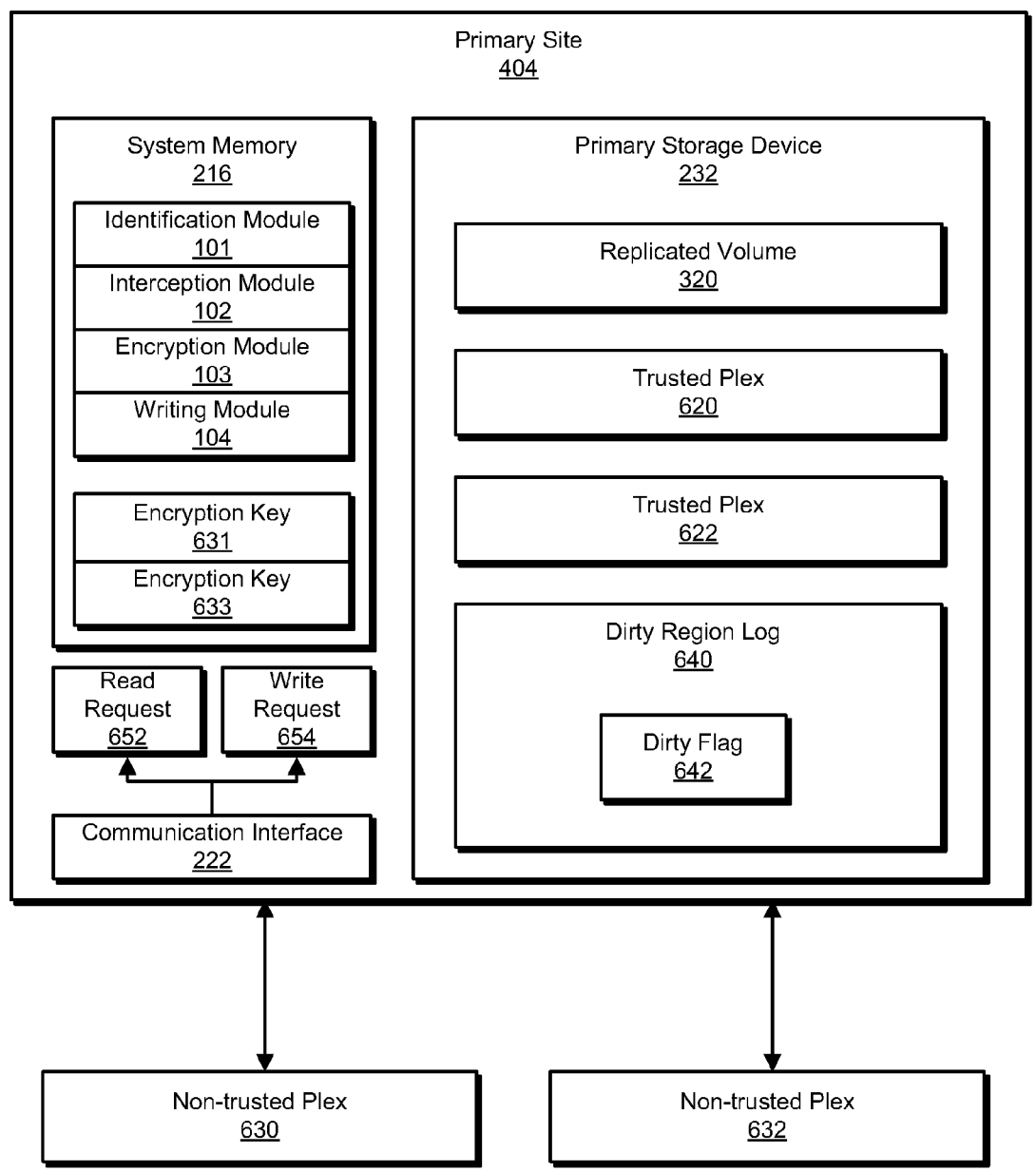
FIG. 6 is a block diagram of an exemplary system for securing data of volume mirrors.

In this example, interception module 102 may then track data changes to the replicated volume using a dirty region log (e.g., dirty region log 640 in FIG. 6). In this context, and as will be described in greater detail below in connection with step 508 in FIG. 5, the data tracked as changed in the dirty region log may later be encrypted. As used herein, a "dirty region log" may include any component or mechanism capable of tracking data changes of a replicated volume.

In some embodiments, interception module 102 may perform step 506 by intercepting application data. As used herein, "application data" may refer to any data generated by an application, as opposed to data generated or used by a volume manager or volume replication system. Generally, application data may refer to any data that is subject to security concerns but does not pertain to the operation of a volume manager or volume replicator.

Returning to FIG. 5, at step 508 encryption module 103 may encrypt the data to be replicated to the non-trusted plex identified in step 504. Encryption module 103 may perform step 508 in a variety of ways. For example, encryption module 103 may encrypt data intercepted by interception module 102. In addition, as mentioned earlier, encryption module 103 may encrypt changed data as indicated by a dirty region log. Additionally or alternatively, as mentioned above, encryption module 103 may encrypt application data.

In some embodiments, encryption module 103 may refrain from encrypting metadata that relates to operations on the non-trusted plex. For example, encryption module 103 may leave a volume manager private disk group area unencrypted in order to allow the non-trusted plex to be imported without first requiring decryption. In another context, and as will be described in greater detail below in connection with FIGS. 8 and 9, encryption module 103 may leave headers of a storage replication log unencrypted in order to allow a bunker site to identify data that still requires replication to a remote site.

In some embodiments, encryption module 103 may encrypt the data to be replicated to the non-trusted plex using the same level of granularity as used when synchronizing the data. For example, as will be described in further detail below in connection with FIGS. 10 and 11, when data of a volume is re-synced, the content of a snapshot may be encrypted with a granularity matching the "region size" used by a re-sync feature of a volume manager (such as the FASTRESYNC feature of VERITAS VOLUME MANAGER).

Encryption module 103 may also assign an encryption key for each non-trusted plex in the set of plexes. In some embodiments, encryption module 103 may assign the same encryption key to all non-trusted plexes. In other embodiments, encryption module 103 may assign a different encryption key to each non-trusted plex. For example, encryption module 103 may assign an encryption key 631 in FIG. 6 to non-trusted plex 630 and an encryption key 633 to non-trusted plex 632. In these embodiments, encryption module 103 may encrypt data to be replicated to non-trusted plex 630 with encryption key 631 and encrypt data to be replicated to non-trusted plex 632 with encryption key 633.

In some embodiments, encryption module 103 may assign an encryption key to a group of non-trusted plexes. For example, as will be described in greater detail below, if an application (such as a backup application) is trusted to access a group of non-trusted plexes, encryption module 103 may: 1) encrypt that group of non-trusted plexes with the same encryption key and 2) provide the decryption key for that group of non-trusted plexes to the trusted application.

Returning to FIG. 5, at step 510 writing module 104 may write the encrypted data from step 508 to the non-trusted plex. For example, writing module 104 may write encrypted data 412 to non-trusted plex 420 in FIG. 4. Writing module 104 may write the encrypted data to the non-trusted plex in any suitable manner. For example, writing module 104 may write the encrypted data through a volume manager or replicator. Upon completion of step 510 in FIG. 5, exemplary method 500 may terminate.

In certain contexts, writing module 104 may write the encrypted data to the non-trusted plex in step 510 by replicating the encrypted data to the non-trusted plex asynchronously. For example, if an application that writes to the replicated volume requires a short response time on write attempts, writing module 104 may asynchronously replicate the encrypted data to non-trusted plexes to increase I/O response time. An exemplary method for asynchronously replicating data to a non-trusted plex in this manner will be described in greater detail below in connection with FIG. 7.

Writing module 104 may also write unencrypted metadata relating to the data to be replicated to the non-trusted plex. For example, as mentioned earlier, encryption module 103 may refrain from encrypting certain metadata, such as a volume manager private disk group area and the headers of a storage replication log. In this example, writing module 104 may write such metadata in an unencrypted format to the non-trusted plex.

In some embodiments, at some later point in time a request module may receive a request to read data from the replicated volume (e.g., a request module may receive a read request 652 in FIG. 6 to read data from replicated volume 320). In this example, the request module may retrieve the data from the non-trusted plex (e.g., non-trusted plex 630 in FIG. 6). The request module may then decrypt the data retrieved from the non-trusted plex.

In certain embodiments, the request module may prefer to fulfill read requests through trusted plexes instead of non-trusted plexes. For example, if the request module receives read request 652 in FIG. 6, the request module may prefer to fulfill read request 652 through trusted plex 620 or trusted plex 622 instead of non-trusted plex 630 or non-trusted plex 632.

The request module may preferentially fulfill read requests through trusted plexes in a variety of ways, including, for example, by always fulfilling a read request through a trusted plex if one is available. Additionally or alternatively, the request module may prefer to fulfill a read request through a trusted plex by generating a score or using an algorithm that tends to favor selection of a trusted plex. In this manner, the request module may reduce the consumption of system resources by avoiding unnecessary decryption when fulfilling read requests.

Figure 7:
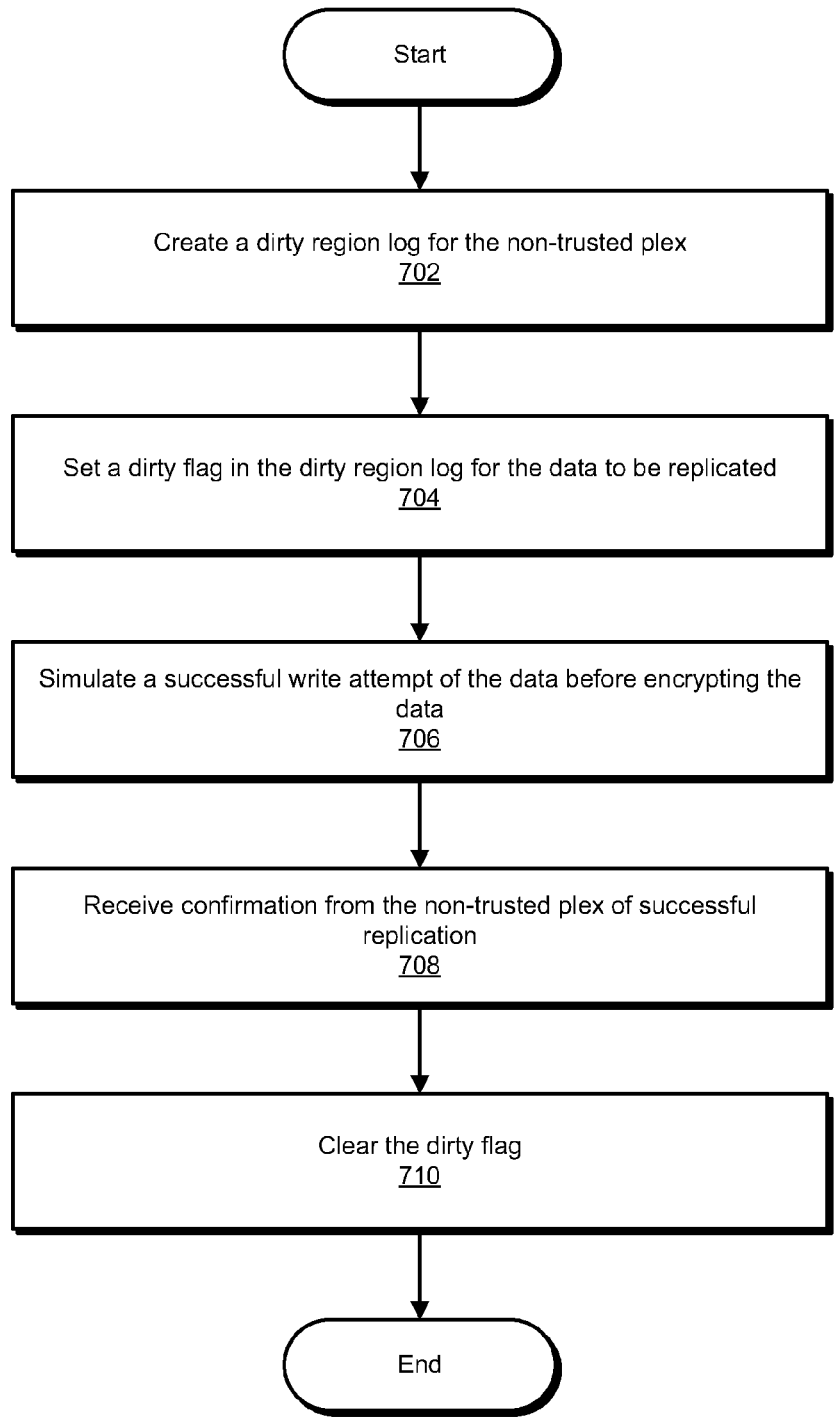
FIG. 7 is a flow diagram of an exemplary method for securing data of volume mirrors.

FIG. 7 is a flow diagram of an exemplary computer-implemented method 700 for securing data of volume mirrors according to an additional embodiment. As mentioned earlier, the steps in FIG. 7 may allow for asynchronous replication to non-trusted plexes. The steps shown in FIG. 7 may be performed by any suitable computer-executable code and/or computing system. In some embodiments, the steps shown in FIG. 7 may be performed by one or more of the components of network architecture 100 in FIG. 1, computing system 210 in FIG. 2, system 300 in FIG. 3, system 400 in FIG. 4, and/or system 600 in FIG. 6 (as will be explained in greater detail below).

For example, at step 702 in FIG. 7, writing module 104 may, as part of primary site 404 in FIG. 6, create a dirty region log for a non-trusted plex (e.g., writing module 104 may create dirty region log 640 for non-trusted plex 630). In some embodiments, writing module 104 may create a single dirty region log for all non-trusted plexes (e.g., writing module 104 may create dirty region log 640 for both non-trusted plex 630 and non-trusted plex 632).

At step 704 in FIG. 7, writing module 104 may set a dirty flag in the dirty region log for a set of data to be replicated to the non-trusted plex (e.g., writing module 104 may set dirty flag 642 in dirty region log 640). Writing module 104 may set the dirty flag, for example, by writing to the dirty region log to indicate that a certain region of data has not been replicated.

At step 706 in FIG. 7, writing module 104 may simulate a successful write attempt of the data to the non-trusted plex before encrypting the data. For example, before encrypting and storing data on non-trusted plex 630, writing module 104 may simulate a successful write attempt by indicating, to an application that originated the write request, that the requested data was successfully written to non-trusted plex 630.

At step 708 in FIG. 7, at some later time writing module 104 may receive confirmation from the non-trusted plex of successful replication. For example, after the data is encrypted and written as described above in steps 508 and 510 of FIG. 5, writing module 104 may receive a signal from the non-trusted plex (e.g., a signal through communication interface 222 from non-trusted plex 630) confirming success in writing to the non-trusted plex.

After receiving confirmation from the non-trusted plex of successful replication, at step 710 writing module 104 may clear the dirty flag. In this manner, writing module 104 may conduct asynchronous writes to the non-trusted plex so that an application originating the write request need not be slowed by encryption during the write attempt. Upon completion of step 710, exemplary method 700 in FIG. 7 may terminate.

Figure 8:
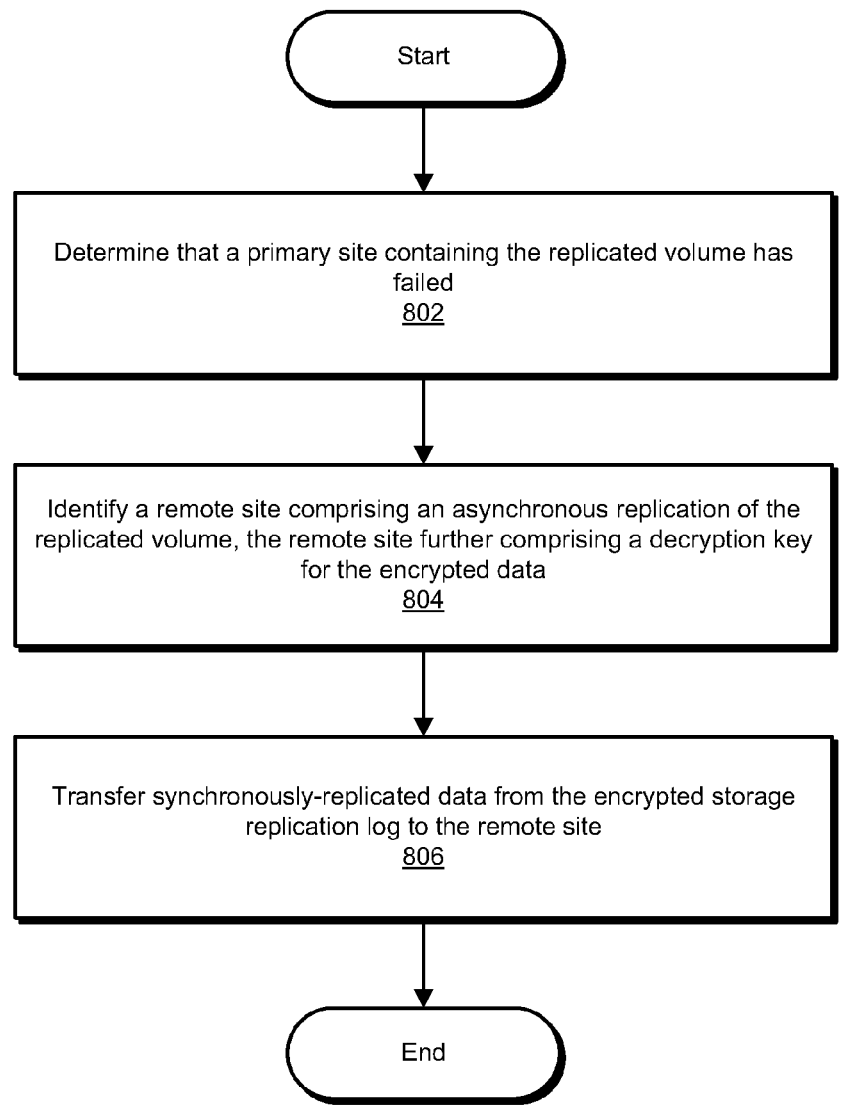
FIG. 8 is a flow diagram of an exemplary method for securing data of volume mirrors.

As detailed above, the systems and methods described herein may be used to accomplish a variety of tasks. In one example, the systems and methods described herein may be used to secure replicated data stored on unsecure or untrusted bunker sites. FIG. 8 is a flow diagram of an exemplary computer-implemented method for performing such a task. The steps shown in FIG. 8 may be performed by any suitable computer-executable code and/or computing system.

In one embodiment, the steps shown in FIG. 8 may be performed by one or more of the components of system 900 in FIG. 9, as will be explained in greater detail below. In the example illustrated in FIG. 9, a primary site 904 may access a bunker site 914 and a remote site 924 across a SAN fabric, such as SAN fabric 180 of FIG. 1. In this example, primary site 904 may asynchronously replicate a replicated volume 320 to a plain-text plex 940 on remote site 924. Primary site 904 may also synchronously replicate and encrypt a storage replication log volume 920 to bunker site 914, resulting in encrypted storage replication log 930. As will be explained below, a decryption key (such as decryption key 928) for decrypting encrypted storage replication log volume 920 may be stored on remote site 924, as opposed to bunker site 914, thus limiting access to encrypted storage replication log volume 920 to remote site 924.

Figure 9:
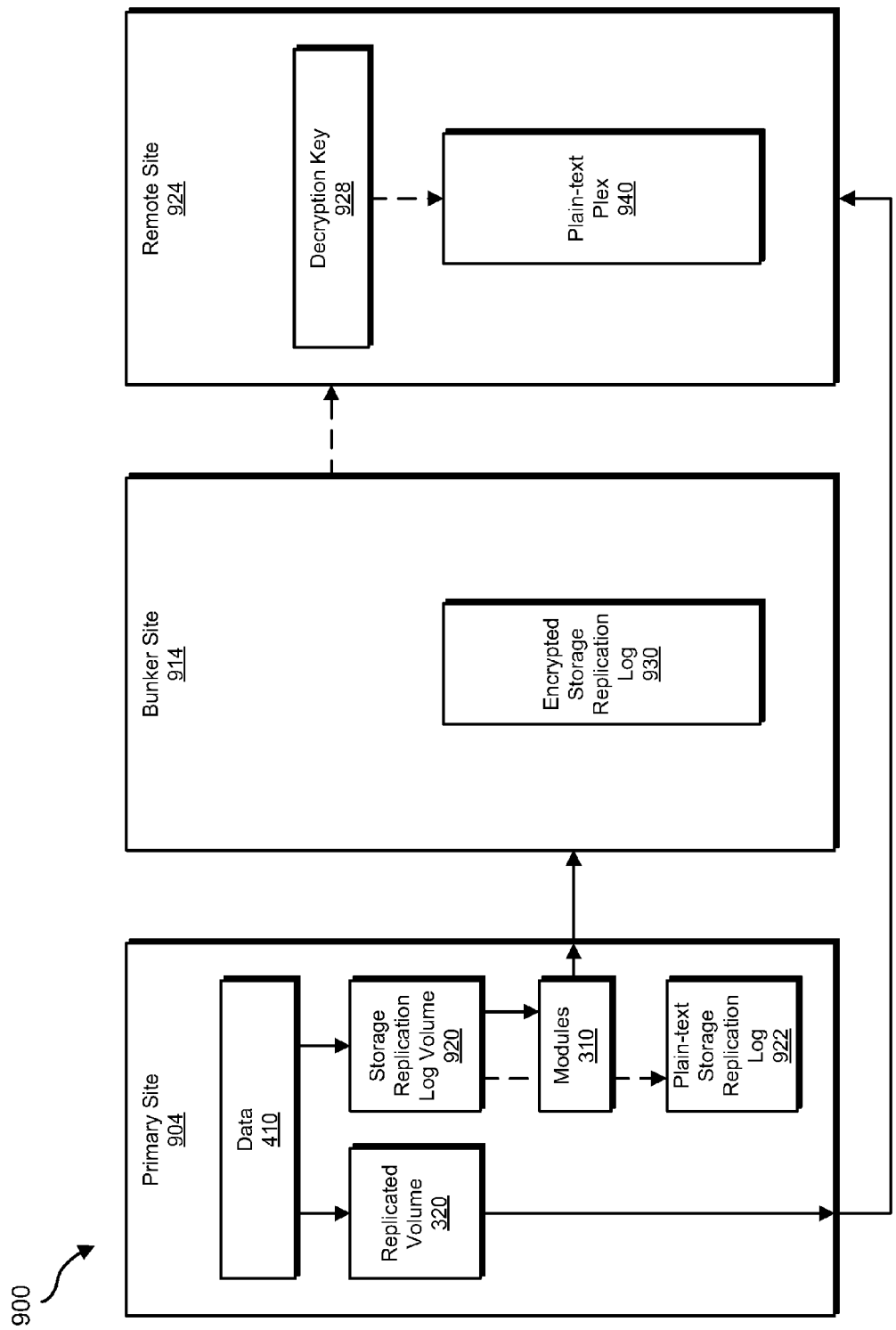
FIG. 9 is a block diagram of an exemplary method for securing data of volume mirrors.

Turning to the method illustrated in FIG. 8, at step 802 writing module 104 of modules 310 in FIG. 9 may determine that a primary site containing a replicated volume has failed (e.g., writing module 104 of modules 310 in FIG. 9 may determine that primary site 904 has failed). Writing module 104 may determine that the primary site has failed in a variety of ways. For example, writing module 104 may determine that the primary site cannot send communications, that the primary site cannot receive communications, that the primary site has crashed, that the replicated volume has been corrupted, and/or any other condition which may preclude continued replication from the primary site.

Once writing module 104 has determined that the primary site containing the replicated volume has failed, at step 804 writing module 104 may identify a remote site containing an asynchronous replication of the replicated volume. For example, writing module 104 may identify remote site 924 containing plain-text plex 940.

Writing module 104 may perform step 804 in a variety of ways. For example, writing module 104 may identify remote site 924 by reading a configuration file on bunker site 914 and/or primary site 904 and/or by querying a volume manager of replicated volume 320. As detailed above, in some examples the remote site may also include a decryption key (such as decryption key 928) for decrypting encrypted data stored on bunker site 914.

Returning to FIG. 8, at step 806 writing module 104 may transfer synchronously-replicated data from an encrypted storage replication log stored on a bunker site to the remote site (e.g., writing module 104 may transfer data from encrypted storage replication log 930 on bunker site 914 to remote site 924). As mentioned earlier, encryption module 103 may leave the private disk group region for a non-trusted plex on bunker site 914 (e.g., encrypted storage replication log 930) unencrypted so that a node at bunker site 914 may import the non-trusted plex without a decryption key.

Furthermore, as mentioned earlier, encryption module 103 may leave headers of a storage replication log unencrypted in order to allow a bunker site to determine which data still requires replication to a remote site. For example, encryption module 103 may leave headers of storage replication log volume 920 unencrypted when encrypting data to be replicated to encrypted storage replication log 930 to allow the identification of data that still needs to be replicated to remote site 924 in the event of a failure of primary site 904. Writing module 104 may thus identify data that has been synchronously replicated to bunker site 914 but that has not yet been asynchronously replicated to remote site 924 at the time of failure of primary site 904.

In this example, writing module 104 may transfer the missing data to remote site 924. For example, writing module may transfer the missing synchronously-replicated data by sending the data to a node at remote site 924, which may in turn decrypt the data with decryption key 928 and write the same to plain-text plex 940. Since decryption key 928 is stored on remote site 924, as opposed to bunker site 914, access to the encrypted data will be limited to remote site 924. Upon completion of step 806 in FIG. 8, exemplary method 800 may terminate.

Figure 10:
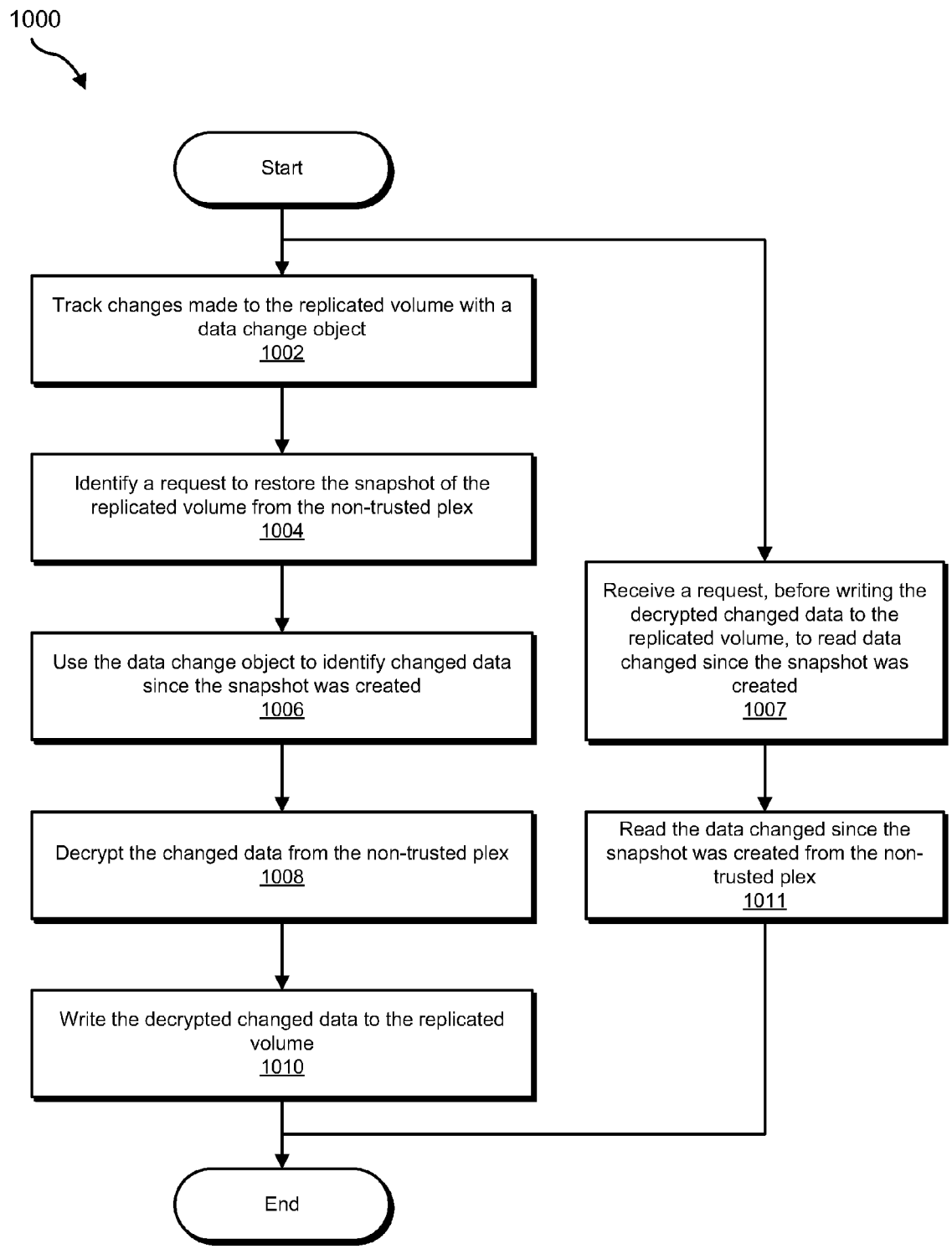
FIG. 10 is a flow diagram of an exemplary method for securing data of volume mirrors.
Figure 11:
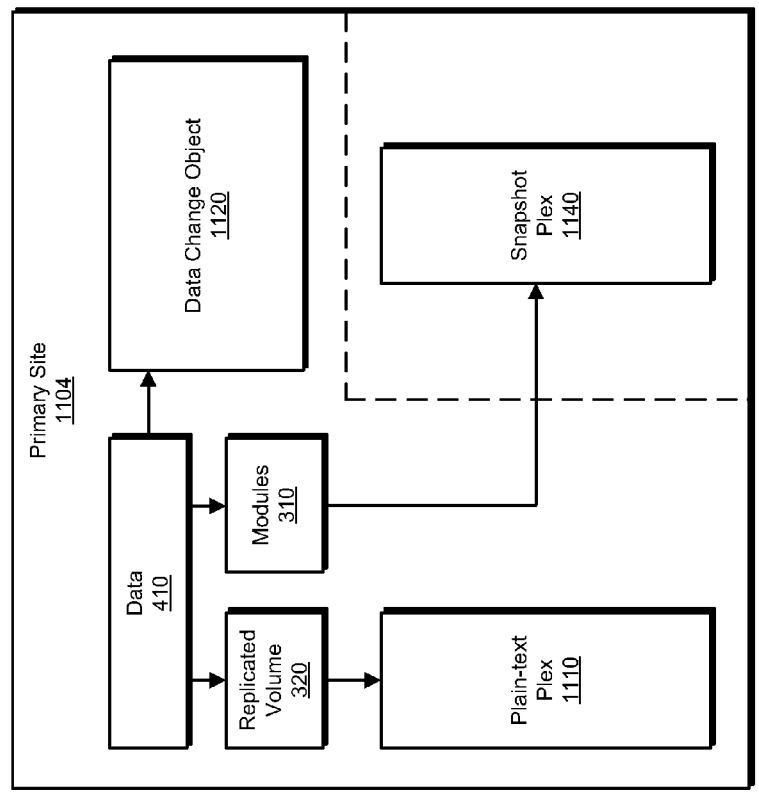
FIG. 11 is a block diagram of an exemplary method for securing data of volume mirrors.

FIG. 10 is a flow diagram of an exemplary computer-implemented method 1000 for securing data of volume mirrors in the context of volume snapshots. The steps shown in FIG. 10 may be performed by any suitable computer-executable code and/or computing system. In some embodiments, the steps shown in FIG. 10 may be performed by one or more of the components of system 1100 in FIG. 11, as will be explained in greater detail below.

In some contexts, snapshot data should only be accessible or available to trusted hosts and/or backup applications. As such, a snapshot plex detached from a main volume (such as a snapshot plex 1140 detached from replicated volume 320 in FIG. 11) should be secured to prevent unauthorized or undesirable access. In one example, encryption module 103 of modules 310 may secure snapshot plex 1140 by intercepting and then encrypting snapshots to be stored on snapshot plex 1140 prior to writing the same to snapshot plex 1140.

A method for restoring encrypted snapshot data from a snapshot plex is illustrated in FIG. 10. As illustrated in this figure, at step 1002 a request module may track changes made to a replicated volume with a data change object (e.g., the request module may track changes made to replicated volume 320 in FIG. 11 with data change object 1120). As used herein, "data change object" may refer to any mechanism or component that enables and/or facilitates re-synchronization of a volume.

At step 1004, the request module may identify a request to restore a snapshot of the replicated volume from the non-trusted plex. For example, the request module may identify a request to restore a snapshot of replicated volume 320 in FIG. 11 from snapshot plex 1140.

At step 1006, the request module may use the data change object to identify changed data since the snapshot was created. For example, the request module may use data change object 1120 to identify data in replicated volume 320 that has been changed since the snapshot was created.

At step 1008, the request module may decrypt the changed data from the non-trusted plex (e.g., the request module may decrypt the changed data from snapshot plex 1140). As mentioned earlier, the content of the snapshot may have been encrypted with a granularity matching the "region size" used by a re-sync feature of a volume manager (such as the FASTRESYNC feature of VERITAS VOLUME MANAGER). In this example, the request module may decrypt the changed data at the granularity appropriate for re-syncing the non-trusted plex with the replicated volume.

At step 1010, the request module may write the decrypted changed data to the replicated volume. For example, the request module may write the decrypted changed data to replicated volume 320 in FIG. 11. Upon completion of step 1010, exemplary method 1000 in FIG. 10 may terminate.

In some embodiments, the request module may receive a request to read from the replicated volume during re-synchronization of the replicated volume. In this example, at step 1007 in FIG. 10, the request module may receive a request, prior to writing the decrypted changed data to the replicated volume, to read data changed since the snapshot was created. The request module may then, at step 1011, read the data changed since the snapshot was created from the non-trusted plex. The request module may then decrypt the changed data as in step 1008, respond to the request, and write the decrypted changed data as in step 1010. If the request module received a read request for unchanged data, the read request may be fulfilled from a plain-text plex.

Figure 12:
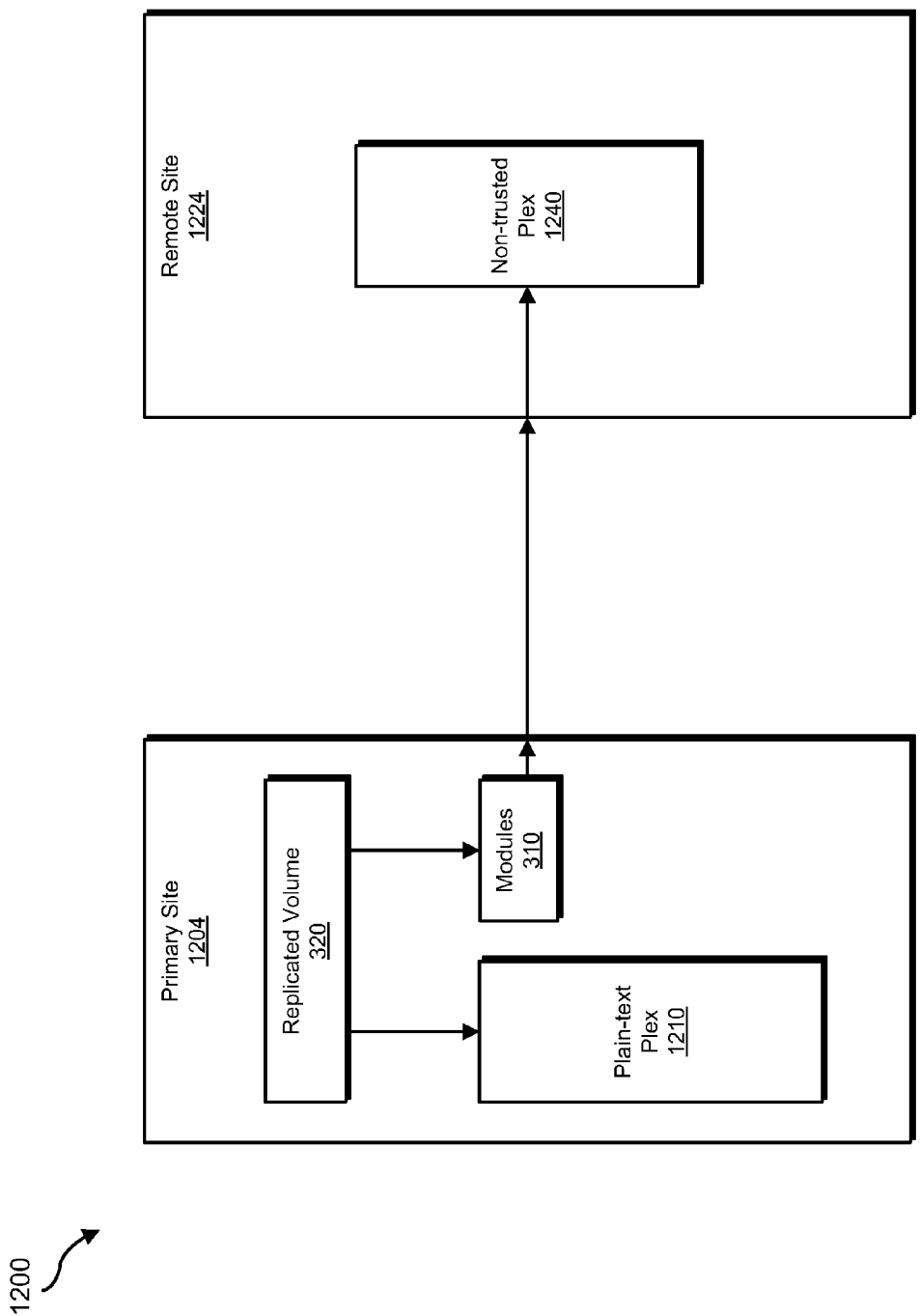
FIG. 12 is a block diagram of an exemplary method for securing data of volume mirrors.

As detailed above, the systems and methods described herein may be used to secure replicated data stored in a variety of ways. FIG. 12 is a block diagram of an exemplary system for securing data of replicated volumes in the context of a campus cluster. In this example, replicated volume 320 on primary site 1204 in FIG. 12 may contain critical data, such as data that should only be accessible or available to trusted applications.

In the example illustrated in FIG. 12, primary site 1204 may access storage (such as storage on one or more remote sites, such as remote site 1224) across a SAN fabric, such as SAN fabric 180 in FIG. 1. Because remote sites (such as remote site 1224) within this SAN fabric may be untrusted, in some examples primary site 1204 may encrypt replication data prior to storing the same on remote sites via the SAN fabric.

For example, as illustrated in FIG. 12, interception module 102 of modules 310 may intercept data to be replicated to a non-trusted plex 1240 on remote site 1224 in a SAN fabric. Prior to writing this data to remote site 1224 via the SAN fabric, encryption module 103 of modules 310 on primary site 1204 may encrypt the data to be replicated to non-trusted plex 1240, as detailed above. Writing module 104 of modules 310 may then write the encrypted data to non-trusted plex 1240.

In one example, the encrypted data stored in non-trusted plex 1240 may only be decrypted using a decryption key. For example, trusted applications and/or trusted remote sites may decrypt data stored in non-trusted plex 1240 using a decryption key provided by primary site 1204, thus securing data stored on untrusted remote site 1224. In some examples, a plurality of remote sites in a campus cluster may share a decryption key.

In some examples, and as explained in greater detail below, if remote site 1224 becomes detached from primary site 1204, any modifications to data in replicated volume 320 may be tracked using a dirty region log. Once remote site 1224 becomes reattached, any changed data as tracked by the dirty region log may be re-synced.

In some examples, one or more plexes of a replicated volume may be stored in a cloud-computing environment. Cloud-computing environments may provide various services and applications via the Internet. These cloud-based services (e.g., software as a service, platform as a service, infrastructure as a service, etc.) may be accessible through a web browser or other remote interface and may be public, private, or a hybrid of the same. As such, storage in cloud-based services may be trusted or untrusted.

Figure 13:
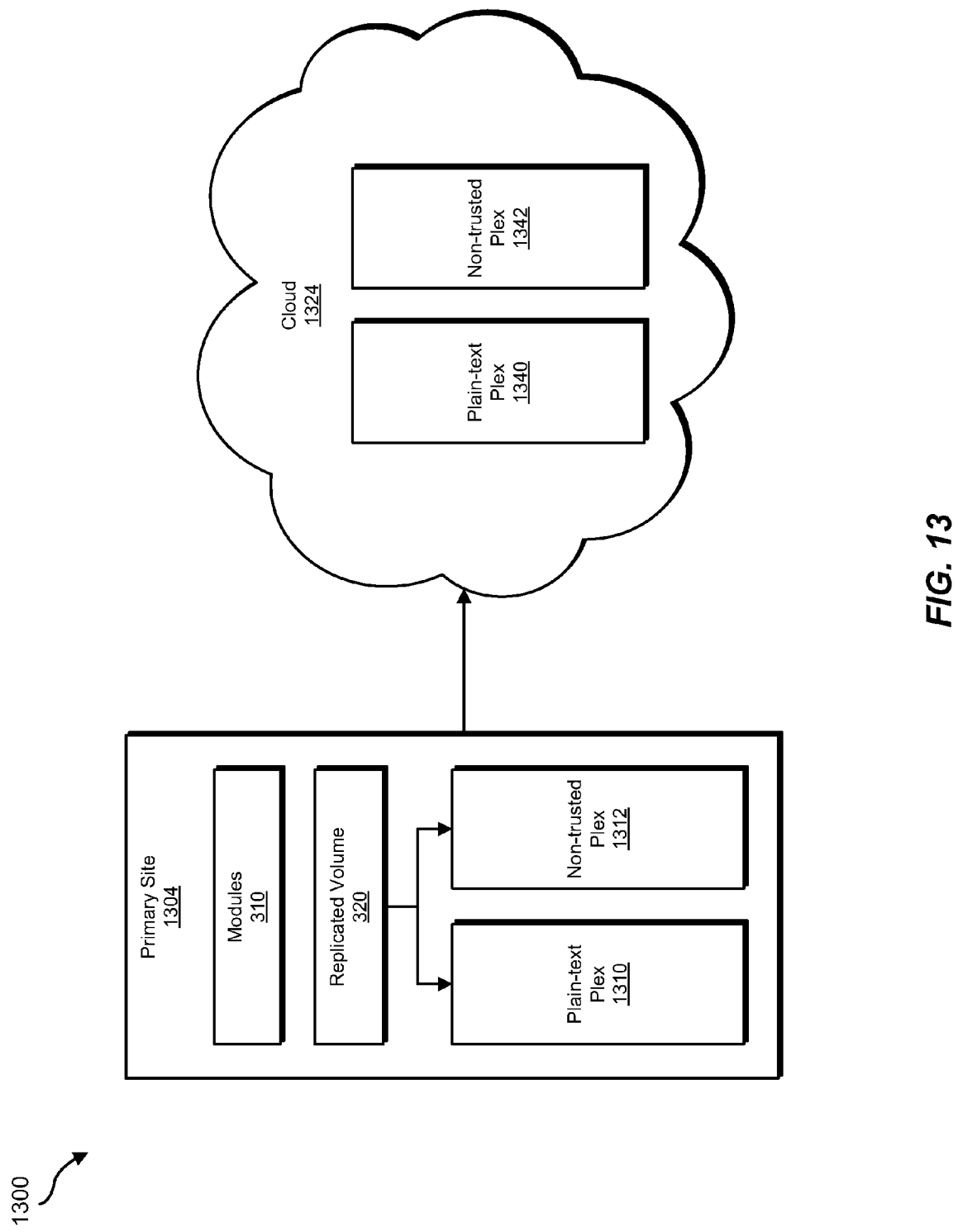
FIG. 13 is a block diagram of an exemplary method for securing data of volume mirrors.

FIG. 13 is a block diagram of an exemplary system for securing data of replicated volumes in the context of a cloud. In this example, replicated volume 320 on primary site 1304 in FIG. 13 may contain critical data. Accordingly, replicated volume 320 may be replicated both locally to a plain-text plex 1310 and a non-trusted plex 1312 and remotely to a plain-text plex 1340 and a non-trusted plex 1342 on a cloud 1324. In this example, data to be replicated to non-trusted plexes 1312 and 1342 may be identified, intercepted, and encrypted before writing the same, as detailed above.

According to some embodiments, primary site 1304 may access storage for plain-text plex 1340 and non-trusted plex 1342 via a SAN fabric (such as SAN fabric 180 of FIG. 1) and/or an IP storage protocol (e.g., iSCSI, FCIP, etc.). In addition, as detailed above, encryption module 103 of modules 310 may assign the same or different encryption keys to one or more of the plexes of cloud 1324.

As detailed above, the various principles described herein may be used in situations where a primary site or host directly writes data to local or remote storage that is visible to the primary site. In such examples, the local or remote storage may contain multiple mirrors of a volume for redundancy purposes. As detailed above, the primary site or host may access these mirrors in a variety of ways, including, for example: 1) through direct-attachment means, 2) in the case of a mirror stored in a SAN fabric, via a storage device present in the SAN fabric, and/or 3) by accessing a storage device that contains the mirror over a network using IP-storage protocols such as iSCSI, FCIP, or the like.

As explained above, by securing (e.g., encrypting) data written to non-trusted plexes, the systems and methods described herein may protect data stored on non-trusted plexes that are otherwise vulnerable to data leaks. In addition, some embodiments described herein may make efficient use of system resources by only encrypting data stored on non-trusted plexes and by preferring to read from trusted plexes to avoid unnecessary decryption, thus potentially reducing I/O latency and processor usage.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

In addition, one or more of the software modules described herein may transform data, physical devices, and/or representations of physical devices from one form to another. For example, modules 310 from FIG. 3 may transform a storage device into a secure replication device by selectively encrypting data read from and/or written to the storage device.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for securing data of volume mirrors, at least a portion of the method being performed by a computing device comprising at least one processor, the method comprising:
   identifying a set of plexes of a replicated volume;
   identifying, within the set of plexes, at least one non-trusted plex;
   intercepting data to be replicated to the non-trusted plex, the data to be replicated to the non-trusted plex originating from an attempt by an application to write the data to the replicated volume;
   simulating, before encrypting the data to be replicated to the non-trusted plex, successful synchronous replication of the data to the non-trusted plex so that the application is not slowed by encrypting the data to be replicated to the non-trusted plex during the attempt by the application to write the data to the replicated volume;
   encrypting the data to be replicated to the non-trusted plex;
   asynchronously replicating the encrypted data to the non-trusted plex;
   wherein the computer-implemented method avoids the performance of unnecessary decryption operations by:
   refraining from encrypting data to be replicated to trusted plexes;
   preferring to fulfill read requests for the replicated volume through trusted plexes instead of non-trusted plexes.

2. The computer-implemented method of claim 1, further comprising:
   receiving a request to read the data from the replicated volume;
   retrieving the data from the non-trusted plex;
   decrypting the data retrieved from the non-trusted plex.

3. The computer-implemented method of claim 1, further comprising determining whether the application requires a short response time on write attempts;
   wherein simulating successful synchronous replication of the data to the non-trusted plex is performed in response to determining that the application requires a short response time on write attempts.

4. The computer-implemented method of claim 1, further comprising:
   before asynchronously replicating the encrypted data to the non-trusted plex:
   creating a dirty region log for the non-trusted plex;
   setting a dirty flag in the dirty region log for the data to be replicated;
   receiving confirmation from the non-trusted plex of successful replication of the encrypted data to the non-trusted plex;
   clearing the dirty flag in response to receiving the confirmation from the non-trusted plex of successful replication of the encrypted data to the non-trusted plex.

5. The computer-implemented method of claim 1, wherein intercepting the data to be replicated to the non-trusted plex comprises:
   detecting that the non-trusted plex has become detached from the replicated volume;
   tracking data changes to the replicated volume with a dirty region log.

6. The computer-implemented method of claim 5, wherein encrypting the data to be replicated to the non-trusted plex comprises encrypting data tracked as changed in the dirty region log.

7. The computer-implemented method of claim 1, further comprising assigning an encryption key for each non-trusted plex in the set of plexes.

8. The computer-implemented method of claim 1, wherein asynchronously replicating the encrypted data to the non-trusted plex comprises writing the encrypted data to an encrypted storage replication log on a bunker site.

9. The computer-implemented method of claim 8, further comprising:
   determining that a primary site containing the replicated volume has failed;
   identifying a remote site comprising an asynchronous replication of the replicated volume, the remote site further comprising a decryption key for the encrypted data;
   transferring synchronously-replicated data from the encrypted storage replication log to the remote site.

10. The computer-implemented method of claim 1, wherein intercepting data to be replicated to the non-trusted plex comprises detecting a snapshot of the replicated volume to be stored in the non-trusted plex.

11. The computer-implemented method of claim 10, further comprising:
    tracking changes made to the replicated volume with a data change object;
    identifying a request to restore the snapshot of the replicated volume from the non-trusted plex;

using the data change object to identify changed data since the snapshot was created;
decrypting the changed data from the non-trusted plex;
writing the decrypted changed data to the replicated volume.

12. The computer-implemented method of claim 11, further comprising:
before writing the decrypted changed data to the replicated volume, receiving a request to read data changed since the snapshot was created;
reading the data changed since the snapshot was created from the non-trusted plex.

13. The computer-implemented method of claim 1, wherein:
intercepting the data to be replicated to the non-trusted plex comprises intercepting application data;
encrypting the data to be replicated to the non-trusted plex comprises encrypting the application data.

14. The computer-implemented method of claim 13, further comprising writing, to the non-trusted plex, unencrypted metadata relating to the data to be replicated.

15. The computer-implemented method of claim 1, further comprising making a decryption key for the non-trusted plex available to a trusted application.

16. The computer-implemented method of claim 1, wherein encrypting the data to be replicated to the non-trusted plex comprises encrypting the data using the same level of granularity as used when synchronizing the data.

17. The computer-implemented method of claim 1, wherein asynchronously replicating the encrypted data to the non-trusted plex comprises writing the data to the non-trusted plex on at least one of:
a remote site in a campus center;
a non-trusted storage site;
a cloud environment.

18. A system for securing data of replicated volumes, the system comprising:
an identification module programmed to:
identify a set of plexes of a replicated volume;
identify, within the set of plexes, at least one non-trusted plex;
an interception module programmed to intercept data to be replicated to the non-trusted plex, the data to be replicated to the non-trusted plex originating from an attempt by an application to write the data to the replicated volume;
an encryption module programmed to encrypt the data to be replicated to the non-trusted plex;
a writing module programmed to:
simulate, before encrypting the data to be replicated to the non-trusted plex, successful synchronous replication of the data to the non-trusted plex so that the application is not slowed by encrypting the data to be replicated to the non-trusted plex during the attempt by the application to write the data to the replicated volume;
asynchronously replicate the encrypted data to the non-trusted plex;
wherein the system avoids the performance of unnecessary decryption operations due to:
the encryption module being programmed to refrain from encrypting data to be replicated to trusted plexes;
a request module programmed to prefer fulfilling read requests for the replicated volume through trusted plexes instead of non-trusted plexes;
at least one processor configured to execute the identification module, the interception module, the encryption module, the writing module, and the request module.

19. A non-transitory computer-readable-storage medium comprising one or more computer-executable instructions that, when executed by at least one processor of a computing device, cause the computing device to:
identify a set of plexes of a replicated volume;
identify, within the set of plexes, at least one non-trusted plex;
intercept data to be replicated to the non-trusted plex, the data to be replicated to the non-trusted plex originating from an attempt by an application to write the data to the replicated volume;
simulate, before encrypting the data to be replicated to the non-trusted plex, successful synchronous replication of the data to the non-trusted plex so that the application is not slowed by encrypting the data to be replicated to the non-trusted plex during the attempt by the application to write the data to the replicated volume;
encrypt the data to be replicated to the non-trusted plex;
asynchronously replicate the encrypted data to the non-trusted plex;
wherein the computer-executable instructions cause the computing device to avoid the performance of unnecessary decryption operations by:
refraining from encrypting data to be replicated to trusted plexes;
preferring to fulfill read requests for the replicated volume through trusted plexes instead of non-trusted plexes.

* * * * *